United States Patent [19]
Serizawa et al.

[11] Patent Number: 4,778,725
[45] Date of Patent: Oct. 18, 1988

[54] FUNCTIONAL POLYMERS DERIVED FROM POLYAMINES AND PROCESS FOR PRODUCING THE SAME

[75] Inventors: Hajime Serizawa; Koichi Ojima, both of Koriyama; Keizo Ogihara, Sukagawa; Kiyoshi Shimizu, Koriyama, all of Japan

[73] Assignee: Nitto Boseki Co., Ltd., Fukushima, Japan

[21] Appl. No.: 43,179

[22] Filed: Apr. 27, 1987

[30] Foreign Application Priority Data

Apr. 28, 1986 [JP] Japan ................................ 61-99145

[51] Int. Cl.⁴ .......................... C08F 8/02; C08F 8/32; C08F 26/00
[52] U.S. Cl. .................................... 428/418; 428/461; 428/500; 525/328.2; 525/379; 525/385; 526/273
[58] Field of Search ..................... 525/328.2, 379, 385; 428/418, 461, 500; 526/273

[56] References Cited

U.S. PATENT DOCUMENTS 3,968,317 7/1976 Dumas .
4,397,993 8/1983 Tefertiller et al. ............... 525/328.2
4,604,451 8/1986 Harada et al. ................... 525/328.2
4,687,817 8/1987 Harada et al. ............... 525/328.2 X

FOREIGN PATENT DOCUMENTS 0207495 1/1987 European Pat. Off. .
0223222 5/1987 European Pat. Off. .
2092911 1/1972 France .

Primary Examiner—Earl Nielsen
Attorney, Agent, or Firm—Bert J. Lewen; Henry Sternberg

[57] ABSTRACT

A functional resin derived from a polyallylamine or polyvinylamine and having unsaturated C=C bonds such as allyl groups at terminals of side chains has good coating properties and strong adhesiveness to a substrate, thus can be used as protective films for various substrates, coating compositions and adhesives.

10 Claims, 2 Drawing Sheets

FUNCTIONAL POLYMERS DERIVED FROM POLYAMINES AND PROCESS FOR PRODUCING THE SAME

BACKGROUND OF THE INVENTION

This invention relates to functional resins derived from polyamines and a process for producing the same.

Many reports on the synthesis of functional resins having carbon-carbon unsaturated bonding portions at side chains of polymers can be divided into the following two categories.

One of them includes a process wherein a vinyl compound having an allyl group ($CH_2$=$CHCH_2$—), which is poor in polymerizability, in its molecule is synthesized and only a vinyl group is selectively polymerized to yield a functional resin having unsaturated groups at side chains; or a process wherein a compound having a functional group (e.g. an epoxy group) which is capable of ring opening polymerization, and a vinyl group and only the ring portion is subjected to ring opening polymerization to yield a functional resin.

The other of them includes a process wherein a suitable resin is selected as a support, which is reacted with a compound having a suitably modified carbon-carbon unsaturated bonding portion to yield a functional resin.

Examples of the former category are syntheses of functional resins having unsaturated groups at side chains by subjecting, for example, acrylic acid (or methacrylic acid) allyl ester, vinyl ethylene oxide, or methacrylic acid glycidyl ester to anion polymerization for polymerizing only the ethylene oxide rings selectively [e.g. M. Dorati, et al: Makromol. Chem. vol. 60, pp. 233–235 (1963); G. Allen, et al: Polymer vol. 5, pp. 553–557 (1964); T. Otsu, et al: Makromol. Chem. vol. 71, pp. 150–158 (1964)]. But these processes are not suitable for industrially practical syntheses of functional resins, since various problems arise in that side reactions such as partial polymerization occur during monomer synthesis, which results in making the separation and purification of the monomer difficult. In the case of applying the functional resins to a special use, the unsaturated groups which are active portions become too active to use. Ionic polymerization is a relatively difficult polymerization technique; and during the polymerization, some unsaturated groups which should be retained as they are as unreacted portions at side chains participate in the polymerization to cause a crosslinking reaction, which results in making the produced resin insoluble.

Examples of the latter category are functional resins obtained by reacting polyvinyl alcohol with cinnamic acid chloride. Such resins are available commercially as photosensitive resins but have a defect in that the development by using neutral water is difficult.

The latter functional resins are usually coated on a glass or metal plate, and exposed to light or heat as an energy source to crosslink unsaturated groups at side chains among polymers to give an insolubilized coating film. When the resin is applied to such a utility, the resin should be not only good in film-forming properties and flexibility but also good in adhesiveness to glass, wooden plate and metal. But the above-mentioned functional resins are not always sufficient as to adhesiveness.

On the other hand, in order to enhance the reactivity of functional resins having functional groups at side chains, it is necessary to facilitate the association between a reactive portion and a substance to be reacted.

For such a purpose, it is desirable that the main chain portion is flexible, and the side chain portion is long to some extent and flexible so as to be bent freely. In other words, the main chain portion is preferably a support having no rigid ring portions and no hetero atoms such as a sulfur atom and an oxygen atom. Further, in order to show good adhesiveness to glass, wood, metal and the like material, these functional resins should have functional groups which show large affinity to these materials at side chains. Production of such functional resins satisfying the above-mentioned requirements has not been reported yet.

SUMMARY OF THE INVENTION

Objects of this invention are to provide functional resins satisfying the above-mentioned requirements and a process for producing the same.

This invention provides a functional resin having repeating units of the formula:

wherein X is not present or an organic acid; Y is a carbon-carbon double bond-containing group represented by the formula:

n is an integer of 10 or more; j and k are integers and the ratio of j/j+k and k/j+k are larger than zero but smaller than one; and t is zero or an integer of 1.

This invention also provides a process for producing a functional resin having repeating units of the formula (I) which comprises reacting a polyallylamine or polyvinylamine having repeating units of the formula:

wherein X is not present or an organic acid; n is an integer of 10 or more; and t is zero or an integer of 1, with an epoxy group-containing allyl compound of the formula:

wherein Y is a carbon-carbon double bond-containig group represented by the formula:

$$-OCH_2CH=CH_2, \text{ or} \quad (II)$$

$$-N\begin{matrix} CH_2CH=CH_2 \\ CH_2CH=CH_2 \end{matrix} \quad (III)$$

DESCRIPTION OF THE PREFERRED EMBODIMENTS

The term "functional resin" in this invention means a resin having unsaturated groups of the formula: $CH_2=Ch-$ at side chains in the formula (I) and being able to be crosslinked when exposed to light or heat or reacted with a special reagent.

The functional resin of this invention has repeating units of the formula:

(I)

wherein X is not present or an organic acid; Y is a carbon-carbon double bond-containing group represented by the formula:

$$-OCH_2CH=CH_2, \text{ or} \quad (II)$$

$$-N\begin{matrix} CH_2CH=CH_2 \\ CH_2CH=CH_2 \end{matrix} \quad (III)$$

n is an integer of 10 or more; j and k are integers and the ratio of j/j+k and k/j+k are larger than zero but smaller than one; and t is zero or an integer of 1.

Examples of the organic acid in the definition of X are a carboxylic acid such as acetic acid.

The functional resin having the repeating units of the formula (I) is obtained by introducing substituents each having a hydroxyl group and carbon-carbon double bond(s) at side chains of polyallylamine or polyvinylamine. By applying the crosslinking properties of these unsaturated groups, it is possible to form a protective film or colored protective film for a substrate material by coating said resin alone or in admixture with a colorant and/or an antiseptic agent on a glass plate, a wooden plate, or a metal plate and heating or exposing to light for crosslinking and insolubilization.

The functional resin having the repeating units of the formula (I) can be produced by reacting a polyallylamine or polyvinylamine having repeating units of the formula:

(IV)

wherein X, t and n are as defined above, with an epoxy group-containing allyl compound of the formula:

(V)

wherein Y is as defined above.

In the formula (IV), when the "t" is 1, a polyallylamine is represented by the formula (IV). When the "t" is zero, a polyvinylamine is represented by the formula (IV).

In the formula (IV), n is an integer of 10 or more, preferably an integer of 500 or less considering the easiness of preparation of the starting material, more preferably an integer of 50 to 300.

The starting polymer having repeating units of the formula (IV) is dissolved in an organic solvent and reacted with the compound of the formula (V) at a temperature preferably from 0° to 100° C. for preferably 10 minutes to 10 days.

Examples of the organic solvent are alcohols such as methanol, ethanol, iso-propanol; methyl Cellosolve and ethyl Cellosolve.

The compound of the formula (V) is preferably used in an amount of 0.2 to 0.8 equivalent weight, more preferably 0.2 to 0.7 equivalent weight, per equivalent weight of the polyallylamine or polyvinylamine of the formula (IV).

This invention is illustrated by way of the following Examples, in which all parts and percents are by weight unless otherwise specified.

REFERENCE EXAMPLE 1

[Synthesis of Polyallylamine]

A polyallylamine.hydrochloride was synthesized by the process taught by Example 1 of Japanese Patent Unexamined Publication No. 58-201811. That is, into 1.1 kg of concentrated hydrochloric acid (35%), 570 g (10 moles) of monoallylamine was dropped with stirring while keeping at 5° to 10° C. with ice cooling. After completion of the dropping, the water and excess hydrogen chloride were removed by distillation at 60° C. under a reduced pressure of 20 mm Hg using a rotary evaporator to give white crystals. The crystals were dried over silica gels for drying at 80° C. under a reduced pressure of 5 mm Hg to yield 980 g of monoallylamine.hydrochloride containing about 5% of water.

In a 2-liter flask equipped with a stirrer, a thermometer, a reflux condenser, and a nitrogen introducing pipe, 590 g (6 moles) of the monoallylamine.hydrochloride and 210 g of distilled water were placed and dissolved with stirring to give a 70% aqueous solution of monoallylamine.hydrochloride. The solution was heated to 50° C. while passing nitrogen gas thereinto. Then, an azo initiator having a cationic nitrogen atom-containing group, i.e., 2,2'-bis(N-phenylamidinyl)2,2'-azopropane.-dihydrochloride in an amount of 14 g was dissolved in 20 ml of distilled water and added thereto. After about 2 hours, the flask was cooled with stirring so as to maintain the solution temperature at 48° to 52° C. by removing the heat generated. The generation of heat was stopped after 10 hours from the addition of the initiator, so that the stirring was stopped to continue the polymerization for additional 60 hours at 50°±1° C. while standing still. Thus, there was obtained a colorless, transparent, viscous solution. The resulting solution was poured into a large amount of methanol to give a white polymer precipitate. The precipitate was filtered using a glass filter and washed with methanol. The thus obtained precipitate was crushed finely without drying, and extracted with methanol for 15 hours using a Soxhlet extractor to remove unpolymerized monoallylamine.hydrochloride. After the extraction, drying at 50° C. under a reduced pressure was conducted to give 533 g (90%) of a polymer. The polymer was subjected to elementary analysis and NMR spectral analysis ($D_2O$, 270 MHz).

The NMR spectral analysis revealed that the obtained polymer was polyallylamine.hydrochloride.

The results of the elementary analysis suggested that the polyallylamine.hydrochloride adsorbed about one molecule of water per 4 monomeric units thereof.

Elementary analysis: (as $C_3H_8NCl$):

|  | C (%) | H (%) | N (%) |
| --- | --- | --- | --- |
| Found | 36.71 | 8.80 | 13.78 |
| Calcd. | 38.51 | 8.61 | 14.97 |
| Calcd. as $C_3H_8NCl.\frac{1}{4}H_2O$ | 36.74 | 8.74 | 14.28 |

The number average molecular weight ($\overline{Mn}$) of the polyallylamine obtained by osmotic pressure measurement in an aqueous solution of sodium chloride was 8500.

Dehydrochlorination treatment of the polyallylamine.hydrochloride was carried out as follows. Sodium hydroxide in an amount of 80 g was dissolved in 350 ml of methanol. To this solution, 187 g of the polyallylamine.hydrochloride was added and stirred at 45° C. for 16 hours. After cooling to room temperature, 142 g of anhydrous sodium sulfate was added thereto for dehydration of neutralization water and allowed to stand for 24 hours.

After filtration of a precipitate present in the reaction solution, there was obtained 360 ml of a methanol solution containing 29% of polyallylamine having a molecular weight ($\overline{Mn}$) of about 5700 (average degree of polymerization 100).

Dehydrochlorination percent of the polyallylamine.hydrochloride measured by conductometric titration using the methanol solution of polyallylamine was 97.0%.

REFERENCE EXAMPLE 2

[Synthesis of Polyvinylamine]

Polyvinylamine.hydrochloride was synthesized by the process taught by D. J. Dawson, et al [J. Am. Chem. Soc. vol. 98, pp 5996–6000 (1976)]. That is, in a 5-liter four-necked flask equipped with a stirrer, a thermometer, a distillation head, 1 liter of water was placed and stirred. Then, 1412 g of acetone-wetted poly(N-vinylacetoamide) cake [containing 424 g (4.98 moles) of poly(N-vinylacetoamide) measured at a dry state] together with 200 ml of water was added to the flask and boiled. After removing the acetone by distillation (maximum distillation temperature 100° C.), the mixture was cooled and treated with 522 ml of 12N hydrochloric acid. When reflux was resumed in an atmosphere of argon, incompletely hydrolyzed products began to precipitate after 20 hours. When 50 ml of water was added thereto, the solution became clear. After 40 hours, the clouded solution was treated with 100 ml of water, and the solution was added, while warm, to isopropanol with rapid stirring to form a precipitate. The product was filtered, washed with 6 liters of isopropanol and dried at 100° C. for 14 hours under a reduced pressure to yield 415 g of slightly colored white powdery solid.

The proton titration (calculated value 12.6 milliequivalent/g, measured value 11.5 milliequivalent/g) and the elementary analysis revealed that the resulting solid comprised 91% (378 g) of polyvinylamine.hydrochloride and 9% of residual isopropanol. After purifying the above-mentioned solid by dialysis, the aqueous solution was added to 12N HCl in an amount 25 times as large as by volume to give a precipitate of polyvinylamine.hydrochloride.

Elementary analysis: (as $C_2H_6NCl)_n$:

|  | C (%) | H (%) | N (%) |
| --- | --- | --- | --- |
| Calcd. | 30.20 | 7.60 | 17.61 |
| Found | 30.75 | 8.26 | 16.89 |

Dehydrochlorination treatment of the obtained polyvinylamine.hydrochloride was carried out in the same manner as described in Reference Example 1 except for using 157 g of the polyvinylamine.hydrochloride in place of 187 g of polyallylamine.hydrochloride. As a result, there was obtained 350 ml of methanol solution containing 21% of polyvinylamine having a molecular weight ($\overline{Mn}$) of about 5600 (average degree of polymerization 130).

Dehydrochlorination percent of the polyvinylamine.hydrochloride measured by conductometric titration was 95.4%.

EXAMPLE 1

In a 500 ml three-necked flask equipped with a stirrer, a reflux condenser and a thermometer, 146 ml of methanol solution containing 22.8 g of the polyallylamine having the molecular weight of about 5700 synthesized in Reference Example 1 was placed and 32.0 g of allyl glycidyl ether (corresponding to 0.7 equivalent weight of allyl glycidyl ether per equivalent weight of polyallylamine) was dropped thereinto in 30 minutes at room temperature with stirring.

After dropping, the system was heated to 40° C. and stirring was continued for 24 hours, followed by cooling to room temperature. Then, the reaction product was poured into about 400 ml of ether. After removing a supernatant liquid, ether was added to the produced viscous gum-like substance with stirring. Then, a supernatant liquid was removed by decantation. After repeating this procedure several times, the gumlike substance was dried under a reduced pressure to give 35.0 g of a white resin.

Figure 1:
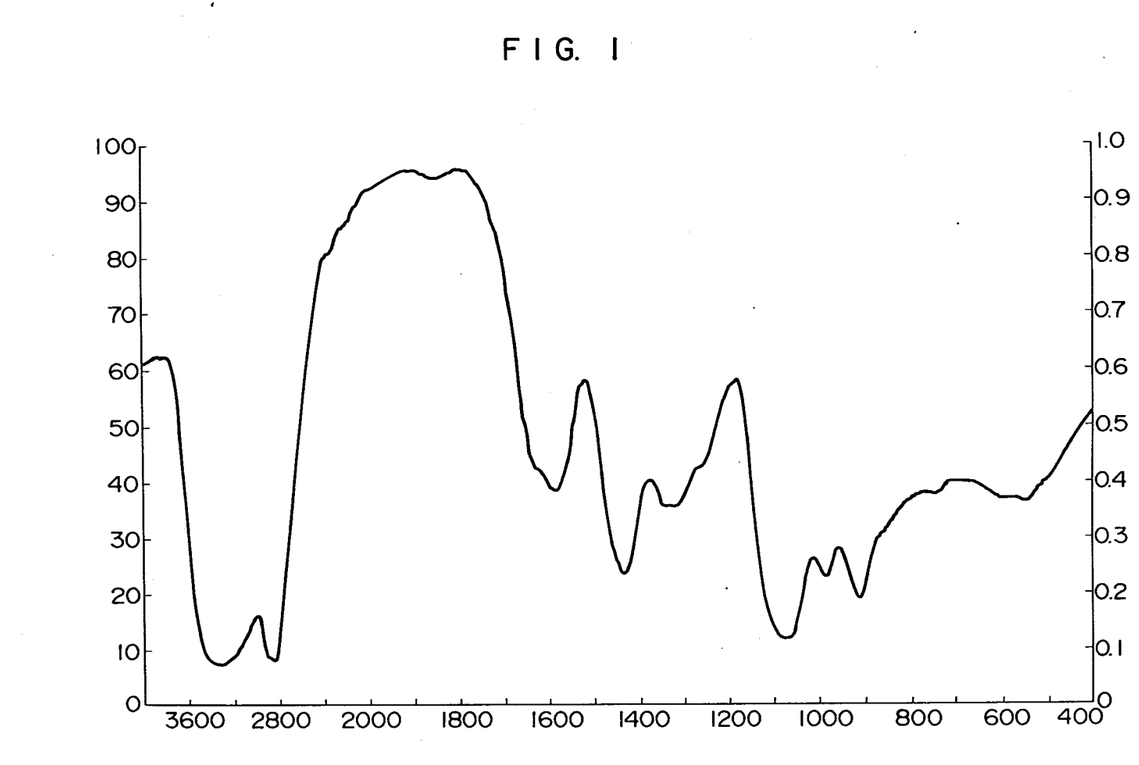
FIG. 1 is an infrared spectrum of the functional resin obtained in Example 1.

An infrared spectrum of the obtained resin is shown in FIG. 1. As is clear from FIG. 1, a broad absorption due to the hydroxyl group and the amino group is present near 3300 $cm^{-1}$. Further, absorptions are seen at 910 $cm^{-1}$ and 990 $cm^{-1}$ corresponding to the unsaturated C=C bond due to the allyl group.

The presence of the unsaturated C=C bond due to the allyl group was also shown by $^1$H-NMR spectra.

From the results of elementary analysis, the presence of about 5% of water in the resin was found. After amending the results of elementary analysis by removing the amount of water, the found values of the resin were in good agreement with the calculated values as shown below:

|  | C (%) | H (%) | N (%) |
|---|---|---|---|
| Found | 62.98 | 10.33 | 10.73 |
| Calcd. | 63.13 | 10.36 | 10.67 |

In the above, the calculated value was obtained by taking $j/j+k$ as 0.65 (this value was calculated from $^1$H-NMR proton absorption spectra at 300 MHz mentioned below) in the formula (I).

Solubility of the resulting functional resin in various solvents is shown in Table 1.

TABLE 1

| Solvent | Solubility* |
|---|---|
| Water | o |
| Methanol | o |
| Ethanol | o |
| Isopropanol | o |
| Methyl Cellosolve | o |
| Ethyl Cellosolve | o |
| DMF | o |
| DMSO | o |
| CHCl$_3$ | o |
| Benzene | x |
| Xylene | x |
| CCl$_4$ | x |
| THF | x |
| Ethyl acetate | x |
| Ether | x |
| Acetone | x |
| Trichloroethylene | x |

Note
*The solubility of 0.1 g of the resin in 10 ml of a solvent.
o: Soluble
x: Insoluble The starting polyallylamine is soluble in water, methanol, and ethanol, but the obtained functional resin is also soluble in organic solvents other than methanol and ethanol as shown in Table 1 and shows considerably diferenct solubility from the polyallylamine.

From the results of IR, $^1$H-NMR, the elementary anaylsis and the solubility, the chemical structure of the obtained resin is concluded to be as follows:

Considereing that "n" of the starting polymer is about 100 and no rupture of the main chain takes place due to the mild reaction conditions, the "n" in the above formula is estimated as 100.

Further, from the value of absorption intensity of the hydrogen atoms of the allyl group in the $^1$H-NMR proton absorption spectrum at 300 MH$_z$, the value of $j/j+k$ was 0.6 to 0.7 (0.65 in average).

Further, the obtained resin began to soften at 180° C. and was decomposed at 200° C. to give brown insoluble material.

EXAMPLE 2

The process of Example 1 was repeated except for changing the amount of allyl glycidyl ether as shown in Table 2. Preparation conditions and properties of the resulting functional resins are shown in Table 2.

TABLE 2

|  | Amount of allyl glycidyl ether | | | |
|---|---|---|---|---|
|  | 22.9 g | 18.3 g | 13.7 g | 9.2 g |
| Equivalent weight to polyallylamine | 0.5 | 0.4 | 0.3 | 0.2 |
| Yield (g) | 31.2 | 26.8 | 24.9 | 21.1 |
| IR absorption |  |  |  |  |
| 3300 cm$^{-1}$ | Yes | Yes | Yes | Yes |
| 990 cm$^{-1}$ | Yes | Yes | Yes | Yes |
| 910 cm$^{-1}$ | Yes | Yes | Yes | Yes |
| Allyl group absorption in $^1$H-NMR | Yes | Yes | Yes | Yes |
| Solubility |  |  |  |  |
| Methyl Cellosolve | o | o | o | o |
| Ethyl Cellosolve | o | o | o | x |
| CHCl$_3$ | o | o | x | x |
| j/j + k | 0.46 | 0.37 | 0.26 | 0.15 |
| n | 100 | 100 | 100 | 100 |

Note
*The value in the structural formula in Example 1.

EXAMPLE 3

In a 1-liter three-necked flask equipped with a stirrer, a reflux condenser and a thermometer, 730 ml of methanol solution containing 114 g of the polyallylamine having the molecular weight of about 5700 synthesized in Reference Example 1 was placed and 114.5 g of allyl glycidyl ether (corresponding to 0.5 equivalent weight of allyl glycidyl ether per equivalent weight of polyallylamine) was dropped thereinto in 1.5 hours at room temperature with stirring.

After continuing the reaction at 40° C. for 24 hours with stirring, the methanol used as a solvent was removed by distillation under a reduced pressure using an evaporator.

Further, in order to remove the water, 300 ml of ethanol was added to the reaction solution and the procedure of distillation under a reduced pressure using an evaporator was repeated three times. The residue was dissolved in 1000 ml of chloroform. An insoluble substance was removed by centrifugation. The supernatant liquid was placed in the three-necked flask and stirred, cooled with ice and subjected to dropping of 132 g of acetic acid at 15° C. or lower in one hour.

The chloroform was removed by distillation using an evaporator to reduce the volume about ⅓. The resulting solution was poured into ethyl acetate to produce a precipitate, which was sufficiently washed with ethyl acetate and dried under a reduced pressure to give 290 g of a solid material.

Figure 2:
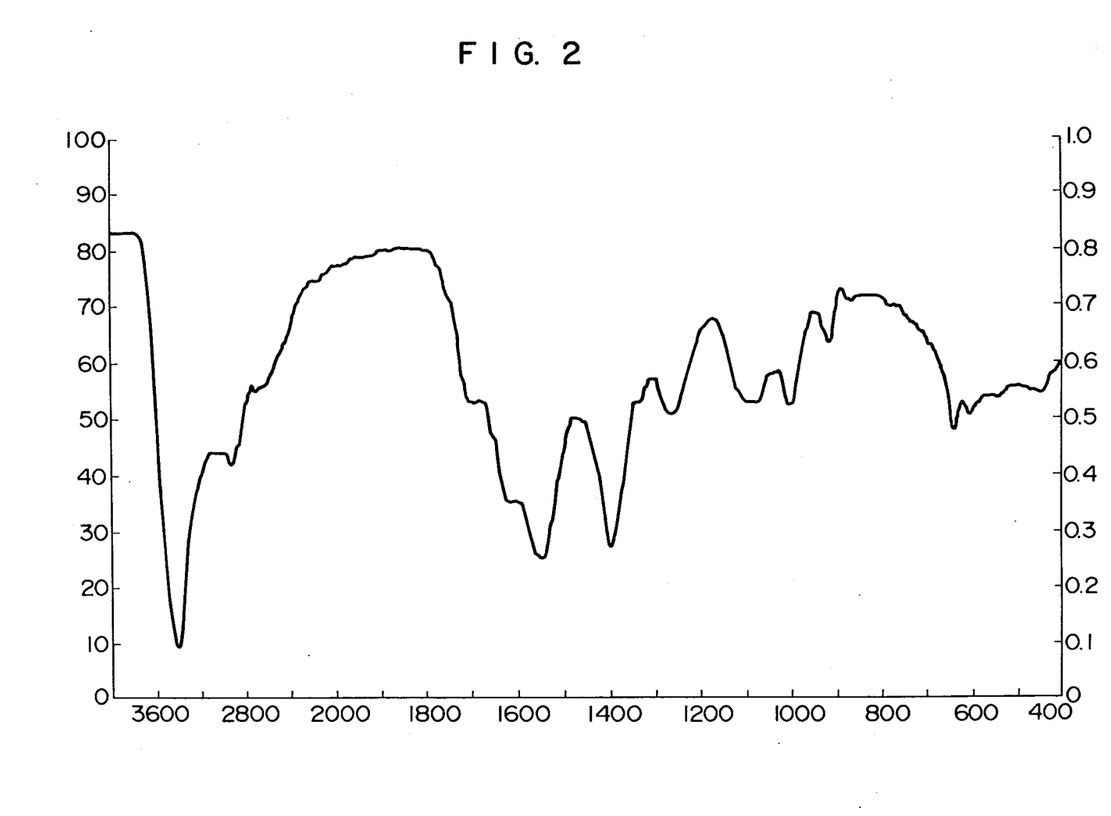
FIG. 2 is an infrared spectrum of the functional resin obtain in Example 3.

FIG. 2 shows an infrared spectrum of the resulting product. As is clear from FIG. 2, there are absorptions corresponding to the unsaturated C=C bond due to the allyl group at 910 cm$^{-1}$ and 990 cm$^{-1}$ and a broad absorption due to the hydroxyl group at 3400 cm$^{-1}$. Further, an absorption due to the carbonyl group in acetate salt is detected at 1700 cm$^{-1}$.

The presence of the absorption of the allyl group was shown by $^1$H-NMR spectra.

From the results of elementary analysis, the presence of about 6% of water in the resin was demonstrated. After amending the results of elementary analysis by removing the amount of water, the found values of the resin were in good agreement with the calculated values.

Solubility of the resulting functional resin in various solvents is shown in Table 3.

TABLE 3

| Solvent | Solubility* |
|---|---|
| Water | o |
| Methanol | o |
| Ethanol | o |
| Isopropanol | o |
| Methyl Cellosolve | o |
| Ethyl Cellosolve | o |
| DMF | o |
| DMFSO | o |
| CHCl$_3$ | o |
| Benzene | x |
| Xylene | x |
| CCl$_4$ | x |
| THF | x |
| Ethyl acetate | x |
| Ether | x |
| Acetone | x |
| Trichloroethylene | x |

*See Table 1.

Polyallylamine.acetate is soluble in water, methanol and ethanol, while the resulting resin is also soluble in solvents in which the polyallylamine.acetate is not soluble, for example, isopropanol, ethyl Cellosolve, etc.; this means that the solubility of the resulting resin is different from that of the polyallylamine.acetate.

From the results of IR, $^1$H-NMR, the elementary analysis and the solubility, the chemical structure of the obtained resin is concluded as follows:

(n = 100, j/j + k = 0.46)

EXAMPLE 4

In a 300-ml three-necked flask equipped with a stirrer, a reflux condenser, and a thermometer, 146 ml of methanol solution containing 17.3 g of the polyvinylamine having the molecular weight of about 5600 synthesized in Reference Example 2 was placed and 32.0 g of allyl glycidyl ether (corresponding to 0.7 equivalent weight of allyl glycidyl ether per equivalent weight of polyvinylamine) was dropped thereinto in 30 minutes at room temperature with stirring.

After continuing the stirring at 40° C. for 24 hours, the flask was cooled naturally to room temperature. After removing a supernatant liquid, ether was added to the produced viscous gum-like substance with sufficient stirring. Then, a supernatant liquid was removed by decantation. After repeating this procedure twice, the gum-like substance was dried under a reduced pressure to give 32.5 g of a white resin.

The obtained resin showed in an infrared absorption (IR) spectrum absorptions corresponding to the unsaturated C=C bond due to the allyl group at 910 cm$^{-1}$ and 990 cm$^{-1}$, and a broad absorption due to the hydroxyl group and the amino group at near 3300 cm$^{-1}$.

The presence of the unsaturated C=C bond due to the allyl group was also demonstrated by $^1$H-NMR spectra.

From the results of elementary analysis, the presence of about 5% of water in the resin was demonstrated. After amending the results of elementary analysis by removing the amount of water, the found values of the resin were in good agreement with the calculated values as shown below:

|  | C (%) | H (%) | N (%) |
|---|---|---|---|
| Found | 61.02 | 9.05 | 11.30 |
| Calcd. | 60.38 | 9.91 | 12.18 |

Solubility of the obtained resin in various solvents is shown in Table 4.

TABLE 4

| Solvent | Solubility* |
|---|---|
| Water | o |
| Methanol | o |
| Ethanol | o |
| Isopropanol | o |
| Methyl Cellosolve | |
| Ethyl Cellosolve | o |
| DMF | o |
| DMSO | o |
| CHCl$_3$ | o |
| Benzene | x |
| Xylene | x |
| CCl$_4$ | x |
| THF | x |
| Ethyl acetate | x |
| Ether | x |
| Acetone | x |
| Trichloroethylene | x |

*See Table 1.

The starting polyvinylamine is soluble in water, methanol, ethanol and isopropanol, but insoluble in DMF (dimethylformamide), DMSO (dimethyl sulfoxide) and CHCl$_3$. In contrast, the obtained resin is also soluble in DMF, DMSO and CHCl$_3$, in which the starting polyvinylamine is insoluble as mentioned above. Thus, the solubility of the obtained resin is clearly different from that of the polyvinylamine.

From the results of IR, $^1$H-NMR, the elementary analysis and the solubility, the chemical structure of the obtained resin is concluded as follows:

n = 130, j/j + k = 0.63)

EXAMPLE 5

The process of Example 4 was repeated except for changing the amount of allyl glycidyl ether as shown in Table 5. Preparation conditions and properties of the resulting functional resins are shown in Table 5.

TABLE 5

| | Amount of allyl glycidyl ether | | | |
|---|---|---|---|---|
| | 22.9 g | 18.3 g | 13.7 g | 9.2 g |
| Equivalent weight to polyvinylamine | 0.5 | 0.4 | 0.3 | 0.2 |
| Yield (g) | 26.5 | 23.8 | 21.0 | 18.6 |
| IR absorption | | | | |
| 3300 cm$^{-1}$ | Yes | Yes | Yes | Yes |
| 990 cm$^{-1}$ | Yes | Yes | Yes | Yes |
| 910 cm$^{-1}$ | Yes | Yes | Yes | Yes |
| Allyl group absorption in $^1$H-NMR | Yes | Yes | Yes | Yes |
| Solubility | | | | |
| Methyl Cellosolve | o | o | o | o |
| Ethyl Cellosolve | o | o | o | x |
| CHCl$_3$ | o | o | x | x |
| j/j + k | 0.45 | 0.36 | 0.26 | 0.16 |
| n | 130 | 130 | 130 | 130 |

*The value in the structural formula in Example 4.

EXAMPLE 6

1-Diallylamino-2,3-epoxypropane was synthesized according to the process disclosed in J. Polym. Sci., vol. 59 (167), pp S1-S2 (1962) by F. W. Michelotti.

The processes described in Examples 1 and 4 were repeated, respectively, except for using 42.9 g of 1-diallylamino-2,3-epoxypropane (corresponding to 0.7 equivalent weight of 1-diallylamino-2,3-epoxypropane per equivalent weight of polyallylamine or polyvinylamine, respectively) in place of 32.0 g of allyl glycidyl ether. As a result, there were obtained 46.3 g of polyallylamine-modified resin and 42.7 g of polyvinylamine-modified resin, respectively.

From IR absorption spectra of the two kinds of obtained resins, absorptions corresponding to the unsaturated C=C bond due to the allyl group at 910 cm$^{-1}$ and 990 cm$^{-1}$ and a broad absorption due to the hydroxyl group and the amino group at 3300 cm$^{-1}$ were observed.

The presence of the unsaturated C=C bond due to the allyl group was also shown by $^1$H-NMR spectra.

The found values of the two obtained resins were in good agreement with the calculated values. Solubilities of the obtained resins in various solvents are shown in Table 6 (polyallylamine-modified resin) and Table 7 (polyvinylamine-modified resin).

TABLE 6

| Solvent | Solubility* |
|---|---|
| Water | o |
| Methanol | o |
| Ethanol | o |
| Isopropanol | o |
| Methyl Cellosolve | o |
| Ethyl Cellosolve | o |
| DMF | o |
| DMSO | o |
| CHCl$_3$ | o |
| Benzene | x |
| Xylene | x |
| CCl$_4$ | x |
| THF | x |
| Ethyl acetate | x |
| Ether | x |
| Acetone | x |
| Trichloroethylene | x |

*See Table 1.

TABLE 7

| Solvent | Solubility* |
|---|---|
| Water | o |
| Methanol | o |
| Ethanol | o |
| Isopropanol | o |
| Methyl Cellosolve | o |
| Ethyl Cellosolve | o |
| DMF | o |
| DMSO | o |
| CHCl$_3$ | o |
| Benzene | x |
| Xylene | x |
| CCl$_4$ | x |
| THF | x |
| Ethyl acetate | x |
| Ether | x |
| Acetone | x |
| Trichloroethylene | x |

As is clear from the results of solubilities, the two obtained resins are different from the starting polyallylamine and polyvinylamine in the solubilities and are soluble in organic solvents such ethyl Cellosolve, CHCl$_3$, etc.

The results of elementary anaylses are as follows:
(i) the functional resin derived from polyallylamine

| | C (%) | H (%) | N (%) |
|---|---|---|---|
| Found | 68.56 | 11.66 | 14.32 |
| Calcd. | 67.81 | 10.78 | 14.81 |

(ii) The functional resin derived from polyvinylamine

| | C (%) | H (%) | N (%) |
|---|---|---|---|
| Found | 66.30 | 10.83 | 15.77 |
| Calcd. | 65.94 | 10.44 | 16.43 |

From the results of IR, $^1$H-NMR, the elemetary analyses and the solubilities, the chemical structures of the two obtained resins are concluded to be as follows:
(i) Functional resin derived from polyallylamine:

(n = 100, j/j + k = 0.64)

(ii) Functional resin derived from polyvinylamine:

(n = 130, j = 0.64)

EXAMPLE 7

The process of Example 1 was repeated except for using each polyallylamine having molecular weight ($\overline{Mn}$) of about 1500 or 2300 produced according to Synthesis Example 1 to give two kinds of functional resins.

When the polyallylamine having the molecular weight of about 1500 was used, the yield was 31.2 g and when the polyallylamine having the molecular weight of about 2300 was used, the yield was 32.4 g.

From the IR absorption spectra and $^1$H-NMR spectra of the two obtained resins, the presence of the allyl group was demonstrated.

The solubilities of the obtained resins were the same as that shown in Table 1 in Example 1.

From the results of elementary analyses, the presence of about 5% of water in the two obtained resins was admitted. After amending the results of elementary analyses by removing the amount of water, the found values of the resins were in good agreement with the calculated values as shown below:

(i) Functional resin derived from polyallylamine ($\overline{Mn}$=c.a. 1500)

|        | C (%) | H (%) | N (%) |
|--------|-------|-------|-------|
| Found  | 63.84 | 10.81 | 11.05 |
| Calcd. | 63.12 | 10.34 | 10.49 |

(ii) Functional resin derived from polyallylamine ($\overline{Mn}$=c.a. 2300)

|        | C (%) | H (%) | N (%) |
|--------|-------|-------|-------|
| Found  | 62.78 | 10.11 | 10.93 |
| Calcd. | 62.10 | 10.30 | 10.58 |

From the results of IR, $^1$H-NMR, the elementary analyses and the solubilities, the chemical structures of the two obtained resins are concluded as follows:

(i) Functional resin derived from polyallylamine ($\overline{Mn}$=c.a. 1500)
  n=26, j/j+k=0.67
(ii) Functional resin derived from polyallylamine ($\overline{Mn}$=c.a. 2300)
  n=40, j/j+k=0.66

EXAMPLE 8

The functional resins obtained in Examples 1 to 7 and the starting polyallylamine obtained in Synthesis Synthesis Example 1 were dissolved in methyl Cellosolve or methanol so as to make the solid content about 10% and coated on glass plates, iron plates, aluminum plates and wooden plates.

Each coated film was dried at 150° C. for 1 hour in the air and the state of each film was observed by the naked eye.

The results are shown in Table 8.

TABLE 8

| | State of film | |
|---|---|---|
| Substrate | Functional resins obtained in Examples 1 to 7 | Polyallylamine |
| Glass | o | x |
| Iron | o | x |
| Aluminum | o | x |
| Wood | o | x |

Note
o: Good state without cracks
x: Cracks and peeling-off took place.

As is clear from Table 8, the functional resins obtained in Examples 1 to 7 show by far better surface state of the coated films and adhesiveness than those of the starting polyallylamine.

As mentioned above, the functional resins of this invention have excellent properties in that the main chain portion is flexible, and the side chain portions have desired length, are flexible and cable of bending, and further at terminals have carbon-carbon double bonds which can be crosslinked when exposed to heat and light. Therefore, the functional resins of this invention can be used as protective films for various substrates, coating compositions, adhesives, and the like.

What is claimed is:

1. A functional resin having repeating units of the formula:

(I)

wherein X is not present or an organic acid; Y is a carbon-carbon double bond-containing group represented by the formula:

$$-OCH_2CH=CH_2, \text{ or} \quad (II)$$

(III)

n is an integer of 10 or more; j and k are integers and the ratios $j/j+k$ and $k/j+k$ are larger than zero but smaller than 1; and t is zero or an integer of 1.

2. A functional resin according to claim 1, wherein X in the formula (I) is acetic acid.

3. A resin composition comprising a functional resin of claim 1 dissolved in an organic solvent.

4. A resin composition according to claim 3, wherein the organic solvent is methanol, ethanol, isopropanol, methyl Cellosolve, ethyl Cellosolve, dimethylformamide, dimethyl sulfoxide or chloroform.

5. A cross-linked resin obtained by heating the resin composition of claim 3.

6. A self-supporting film comprising the functional resin of claim 1.

7. A substrate coated with the resin composition of claim 3.

8. A metal coated with the resin composition of claim 3.

9. A process for coating a substrate which comprises applying a resin composition comprising a functional resin having repeating units of the formula:

(I)

wherein X is not present or an organic acid; Y is a carbon-carbon double bond-containing group represented by the formula:

$$-OCH_2CH=CH_2, \text{ or} \qquad (II)$$

(III)

n is an integer of 10 or more; j and k are integers and the ratios $j/j+k$ and $k/j+k$ are larger than zero but smaller than 1; and t is zero or an integer of 1, dissolved in an organic solvent and, thereafter, removing the solvent.

10. A process for producing a functional resin having repeating units of the formula:

(I)

wherein X is not present or an organic acid; Y is a carbon-carbon double bond-containing group represented by the formula:

$$-OCH_2CH=CH_2, \text{ or} \qquad (II)$$

(III)

n is an integer of 10 or more; j and k are integers and the ratios $j/j+k$ and $k/j+k$ are larger than zero but smaller than 1; and t is zero or an integer of 1, which comprises reacting a polyallylamine or polyvinylamine having repeating units of the formula:

(IV)

wherein X, n, and t are as defined above, with an epoxy group-containing allyl compound of the formula:

(V)

wherein Y is as defined above.

* * * * *